3,091,570
ANTIDEPRESSANT: 3-PYRROLIDYL GLYCOLATES
John H. Biel, Milwaukee, Wis., assignor to Lakeside Laboratories, Inc., Milwaukee, Wis., a corporation of Delaware
No Drawing. Filed Aug. 8, 1960, Ser. No. 47,897
4 Claims. (Cl. 167—65)

This invention relates to chemical compounds and processes of producing the same. More particularly, this invention is concerned with novel 3-pyrrolidyl glycolates, processes of producing such compounds, and uses for the compounds.

According to the present invention it has been discovered that 3-pyrrolidyl-dicyclicglycolates of the formula

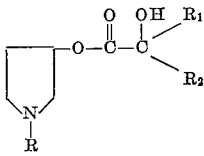

are potent antispasmodics and central nervous system stimulants, wherein R is hydrogen, a lower alkyl such as methyl, ethyl, propyl, isopropyl and butyl, a lower alkenyl such as allyl, a lower alkynyl such as propargyl, an aryl and particularly the phenyl and nuclear substituted phenyl groups, aralkyl groups and particularly the phenyl-lower alkyl groups such as benzyl, phenethyl and phenylpropyl groups, as well as similar groups in which the aryl moiety is diphenyl or napthhyl, and aralkenyl groups such as the phenyl-lower alkenyl groups like the cinnamyl group, $R_1$ is phenyl, thienyl, pyridyl, cyclohexyl, cyclopentyl, cyclohexenyl, cyclopentenyl or cyclopentadienyl, and $R_2$ is phenyl, cyclopropyl, cyclobutyl, cyclopentyl, cyclopentenyl, cyclohexenyl, cyclopentadienyl o. thienyl.

These compounds, except when R is hydrogen, can be produced by reacting a 3-pyrrolidinol with a lower alkyl ester of the dicyclic glycolic acid to form, via ester interchange, the desired 3-pyrrolidyl dicyclic glycolate. This reaction can be represented as follows:

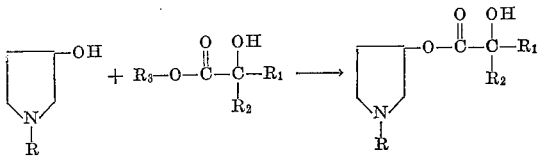

wherein $R_3$ is a lower alkyl such as methyl, ethyl, propyl or butyl and R, $R_1$ and $R_2$ have the significance previously assigned.

Some of the 3-pyrrolidinols that may be used in this process are:

3-pyrrolidinol
N-methyl-3-pyrrolidinol
N-ethyl-3-pyrrolidinol
N-isopropyl-3-pyrrolidinol
N-allyl-3-pyrrolidinol
N-propargyl-3-pyrrolidinol
N-beta-phenethyl-3-pyrrolidinol
N-cinnamyl-3-pyrrolidinol, and
N-phenyl-3-pyrrolidinol Some of the lower alkyl esters of the dicyclicglycolic acids that can be used in the process are:

Methyl alpha-phenyl-alpha-cyclopropylglycolate
Ethyl alpha-phenyl-alpha-cyclobutylglycolate
Cyanomethyl alpha-phenyl-alpha-cyclopentenylglycolate
Methyl alpha-phenyl-alpha-2-thienylglycolate
Methyl alpha-2-thienyl-alpha-cyclopentylglycolate
Methyl alpha-phenyl-alpha-cyclopentylglycolate
Methyl alpha-phenyl-alpha-cyclopentenylglycolate
Methyl alpha-phenyl-alpha-cyclopentadienylglycolate
Methyl alpha-(2-chlorophenyl)-alpha-cyclohexylglycolate
Methyl alpha-(3-methoxyphenyl)-alpha-cyclohexenylglycolate
Methyl alpha-phenyl-alpha-cyclohexylglycolate
Methyl alpha-(4-pyridyl)-alpha-cyclopentylglycolate Reaction between the lower alkyl dicyclicglycolate and the 3-pyrrolidinol is conveniently effected by bringing the reactants together in a suitable inert solvent, advisably in the presence of sodium or a metal alkoxide such as sodium or aluminum alkoxide. Organic liquids such as n-heptane, toluene, xylene or cumene, and others which are inert, can be used for the reaction medium. The mixture is generally heated to promote the reaction with the reflux temperature being preferred. As the reaction proceeds, the lower alcohol which is formed in the reaction is distilled off. The reaction is considered completed when the low boiling alcohol ceases to distill off. The product can be recovered by filtering the mixture, washing with water and evaporating to dryness.

Some of the 3-pyrrolidinyl dicyclicglycolates which are produced in this way are:

N-methyl-3-pyrrolidyl phenylcyclopentylglycolate
N-ethyl-3-pyrrolidyl phenylcyclopentylglycolate
N-methyl-3-pyrrolidyl phenylcyclohexylglycolate
N-ethyl-3-pyrrolidyl phenylcyclohexylglycolate
N-methyl-3-pyrrolidyl phenylcyclopropylglycolate
N-allyl-3-pyrrolidyl phenyl-2-thienylglycolate
N-propargyl-3-pyrrolidyl phenylcyclopentenylglycolate
N-(beta-phenethyl)-3-pyrrolidyl phenylcyclohexylglycolate
N-cinnamyl-3-pyrrolidyl phenylcyclopentadienylglycolate
3-pyrrolidyl phenyl-4-pyridylglycolate
N - methyl - 3 - pyrrolidyl - 3 - methoxyphenylcyclopropylglycolate The compounds so produced are novel compounds except for N-ethyl-3-pyrrolidyl benzilate which is shown in C.A. 53, 20522C.

The compounds wherein R is hydrogen can be produced by subjecting an N-arylmethyl-3-pyrrolidyl dicyclicglycolate to catalytic hydrogenation to cleave the N-arylmethyl group. The N-arylmethyl groups cleaved in this way are N-benzyl, N-diphenyl-methyl and N-napththyl-methyl.

The catalytic hydrogenation is readily effected by adding the N-arylmethyl-3-pyrrolidyl dicyclicglycolate, preferably as a salt such as the hydrochloride, to a solvent such as water or a lower alcohol. Low pressures of up to 100 p.s.i. of hydrogen are satisfactory. Palladium is a particularly useful catalyst for the hydrogenation. The hydrogenation proceeds quickly and its progress can be measured by the hydrogen uptake. When the hydrogen uptake ceases the reaction may be considered completed. After filtering the reaction mixture it may be evaporated to dryness and the product triturated with a solvent such as ether and separated by filtration.

Representative of the 3-piperidyl dicyclicglycolates produced in this way are:

3-pyrrolidyl phenylcyclopentylglycolate
3-pyrrolidyl phenylcyclohexylglycolate
3-pyrrolidyl phenylcyclopropylglycolate
3-pyrrolidyl phenyl-2-thienylglycolate
3-pyrrolidyl phenylcyclopentenylglycolate
3-pyrrolidyl phenylcyclopentadienylglycolate
3-pyrrolidyl benzilate Acid addition salts of the bases provided by this invention are readily produced by contacting the free base with a suitable acid in the presence of a solvent such as acetone, benzene, ethanol, isopropanol or ether. Typical acids which can be used are hydrochloric, sulfuric, citric, tartaric, succinic, benzoic, phosphoric, and maleic acids.

Quaternary ammonium salts of the bases are also readily produced by contacting the base with an appropriate alkylating agent such as a lower alkyl halide such as methyl bromide or ethyl chloride, a lower alkyl sulfate such as ethyl sulfate, or a phenylalkyl halide or sulfate such as phenethyl chloride, benzyl sulfate or benzylbromide.

The compounds provided by this invention are potent antispasmodic and gastric antisecretory agents useful in the treatment of peptic ulcer and other gastro-intestinal disorders. These properties are also displayed by their acid addition and quaternary ammonium salts. Furthermore, the basic esters or their acid addition salts are powerful stimulants of the central nervous system and, therefore, are of value in the treatment of psychic depressions. The quaternary ammonium salts are devoid of the central stimulating properties. The most active central nervous system stimulants are those where R is a lower alkyl group.

The dual property of psychic stimulation and antispasmodic-antisecretory action makes these compounds especially useful in the treatment of many psychosomatic diseases such as peptic ulcer, ulcerative colitis, biliary dyskenesia, and irritable bowel. Since many of these diseases are psychogenically induced, the treatment of both the primary cause as well as its physiologic repercussion represents a novel therapeutic approach to this type of pathologic process.

The compounds are also useful pharmacological tools in studying spasmodic and mental disorders and in evaluating other drugs for such activity since they can be used as standards.

Since the compounds form salts with acids they can be used as neutralizing agents and also in the isolation of penicillin from fermentation broths.

The active agents of this invention can be administered to animals and humans as pure compounds. It is advisable, however, to first combine one or more of the novel compounds with a suitable pharmaceutical carrier to attain a more satisfactory size to dosage relationship.

Pharmaceutical carriers which are liquid or solid can be used. The preferred liquid carrier is water. Flavoring materials can be included in the solutions as desired.

Solid pharmaceutical carriers such as starch, sugar, talc and the like may be used to form powders. The powders can be used as such for direct administration to a patient or, instead, the powders can be added to suitable foods and liquids, including water, to facilitate administration.

The powders can also be used to make tablets, or to fill gelatin capsules. Suitable lubricants like magnesium stearate, binders such as gelatin, and disintegrating agents like sodium carbonate in combination with citric acid can be used to form tablets.

Unit dosage forms such as tablets and capsules can contain any suitable predetermined amount of one or more of the active agents as a nontoxic salt and may be administered one or more at a time at regular intervals. Such unit dosage forms, however, should generally contain a concentration of 1.0% to 50.0% by weight of one or more of the active compounds provided by this invention. In general, such unit dosage forms can contain about 5 to 300 mgm. of active agent.

The oral route is preferred for administering the active agents of this invention.

The following examples are presented to illustrate the invention.

EXAMPLE 1

*N-Methyl-3-Pyrrolidyl Phenylcyclopentylglycolate and Its Hydrochloride Salt*

A mixture consisting of 17.2 g. (0.073 mole) of methyl-phenylcyclopentylglycolate, 7.4 g. (0.073 mole) of N-methyl-3-pyrrolidinol, 0.5 g. of sodium methoxide and 200 cc. of heptane was refluxed for five hours while 4.3 cc. of methanol was collected. The catalyst was filtered off and the filtrate was washed with water, dried over potassium carbonate, concentrated to dryness in vacuo, and it weighed 20.1 g. (90.7%).

*Hydrochloride salt.*—The residue was dissolved in 200 cc. of anhydrous ether and acidified to pH 2 with ethereal hydrochloric acid. The solid was filtered off, and dried at 95° C. Wt. 17.2 g., M.P. 164–166° C. The solid was recrystallized in 50 cc. of boiling acetonitrile, which was treated with charcoal. Wt. 6.5 g., M.P. 169–170° C.

*Analysis.*—Calcd. for $C_{18}H_{26}ClNO_3$: N, 4.12; Cl, 10.43. Found: N, 4.20; Cl, 10.45.

EXAMPLE 2

*N-Ethyl-3-Pyrrolidyl Phenylcyclopentylglycolate and Its Hydrochloride Salt*

A mixture of 6.4 g. (0.055 mole) of N-ethyl-3-hydroxypyrrolidine, 13.0 g. (0.055 mole) of methyl phenylcyclopentylglycolate, 150 ml. of n-heptane, 1 ml. of methanol and a total of 0.4 g. of sodium methoxide was stirred at reflux until the separation of methanol in a water separator ceased. The mixture was filtered hot, diluted with chloroform, washed twice in 25 ml. of water and the organic phase dried briefly over anhydrous potassium carbonate. It was filtered and the solvents removed in vacuo; 16 g. (92%).

*Hydrochloride salt.*—The base was dissolved in 150 ml. of anhydrous ether and acidified to pH 3 with ethereal HCl. The acid ether was decanted and the gum covered with fresh ether and refrigerated. The precipitate was filtered, washed with ether and dried. 16 g. of product was recrystallized from 70 ml. warm acetonitrile, filtered and dried. (I) M.P. 165–167° C. (dec.) 3. g. The filtrate was diluted with ether and filtered. (II) M.P. 158–160° C. (dec.) 7.0 g. Fraction (II) was recrystallized from 25 ml. of warm acetonitrile and treated with charcoal, filtered and dried, M.P. 165–166° C. (dec.) 4.0 g. Total yield 7.3 g. (42%).

*Analysis.*—Calcd. for $C_{19}H_{28}ClNO_3$: N, 3.95; Cl⁻, 10.01. Found: N, 3.95; Cl⁻, 10.12.

Various changes and modifications of the invention can be made and, to the extent that such variations incorporate the spirit of this invention, they are intended to be included within the scope of the appended claims.

What is claimed is:

1. The method of inducing central nervous system stimulation and an antidepressive effect in a human which comprises administering to the human a compound of the formula

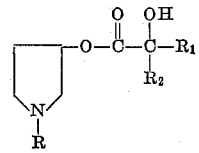

and nontoxic acid addition salts thereof wherein R is a member of the group consisting of hydrogen, lower alkyl, phenyl and phenyl-lower alkyl, $R_1$ is a member of the group consisting of phenyl, thienyl, pyridyl, cyclohexyl, cyclopentyl, cyclohexenyl, cyclopentenyl and cyclopentadienyl, and $R_2$ is a member of the group consisting of phenyl, cyclopropyl, cyclobutyl, cyclopentyl, cyclopentenyl, cyclohexenyl, cyclopentadienyl and thienyl.

2. The method of claim 1 wherein said compound is N-methyl-3-pyrrolidyl phenylcyclopentylglycolate.

3. The method of claim 1 wherein said compound is N-ethyl-3-pyrrolidyl phenylcyclopentylglycolate.

4. The method of claim 1 in which 5 to 300 mgm. of the compound in a pharmaceutical unit dosage form is administered.

(References on following page)

References Cited in the file of this patent

UNITED STATES PATENTS

| | | |
|---|---|---|
| 2,800,426 | Kaellner et al. | July 23, 1957 |
| 2,804,422 | Schmann et al. | Aug. 27, 1957 |
| 2,956,062 | Lunsford | Oct. 11, 1960 |

FOREIGN PATENTS

| | | |
|---|---|---|
| 555,178 | Belgium | Aug. 20, 1957 |
| 821,436 | Great Britain | Oct. 7, 1959 |

OTHER REFERENCES

Biel et al., J. Am. Chem. Society, pages 2250–55, vol. 77 (1955).